UNITED STATES PATENT OFFICE.

GEORGE HILLARD BENJAMIN, OF NEW YORK, N. Y.

PROCESS OF PRODUCING ALCOHOL FOR USE IN THE ARTS ALONE.

SPECIFICATION forming part of Letters Patent No. 667,359, dated February 5, 1901.

Application filed April 9, 1900. Serial No. 12,087. (No specimens.)

*To all whom it may concern:*

Be it known that I, GEORGE HILLARD BENJAMIN, a citizen of the United States, residing at New York, county and State of New York, have invented a Process of Producing Alcohol for Use in the Arts Alone, of which the following is a specification.

In the manufacture of alcohol from calcium carbid it has been observed that where ordinary commercial carbid of calcium is employed and the acetylene and ethylene gases derived therefrom are not washed or otherwise purified the resultant alcohol contains ammonium, sulfur, or phosphorous compounds which render it unfit for use as a basis for beverages or as a food product. It has likewise been found that most, if not all, of these compounds can be removed by a suitable chemical treatment. However, I have found by experiment that if there be added to the hydrogen-ethyl sulfate produced in the process of making alcohol from calcium carbid a noxious substance of any sort having a boiling-point approximating that of alcohol the impurities incorporated with the alcohol cannot be removed by any known chemical process.

The object of my invention, therefore, is, first, to produce as an original product a spirit which is unfit for use as a basis for beverages or as a food product, and, second, a process whereby there is fixed in the spirit during the process of its manufacture a substance which renders it unfit for use as a basis for beverages or as a food product.

To carry my invention into effect, I find it convenient to use the process described in United States Letters Patent No. 608,652, granted on August 9, 1898, to Frederic R. Coudert, Jr., as administrator of the estate of Aime Mathieu Villon, deceased, so far as said process relates to all of the steps leading to the production of hydrogen-ethyl sulfate, which, concisely stated, are as follows: Acetylene is produced by adding water to calcium carbid, the acetylene is then carried into a solution of chromous sulfate, and the resultant ethylene is then carried through suitable sulfuric-acid-absorption apparatus, whereby there is produced hydrogen-ethyl sulfate. I do not limit myself to the process described in the mentioned patent for producing hydrogen-ethyl sulfate, as it may be produced by other methods known to chemists.

To the hydrogen-ethyl sulfate produced in any manner I add a noxious substance of any sort having a boiling-point corresponding approximately to that of alcohol. Preferably I add from one to three per cent., by weight, of bone-oil, otherwise known as "Dippel's" oil, (specific gravity 0.914 to 0.970,) which contains fatty nitriles pyrrol and its methyl derivatives, hydrocarbons of the series $C_nH_{2n-4}$, various compound ammonias, and pyridin bases. Subsequently to the introduction of the bone-oil thirty-three per cent. of water is added, and the mixture of hydrogen-ethyl sulfate, water, and bone-oil is then subjected to heat and the resultant vapors condensed to produce an alcohol suitable for use in the arts only.

Instead of first introducing the oil and then the water they may be mixed and introduced together, or the water may be first added and the oil subsequently introduced.

By my improved process a product is cheaply obtained which is entirely free from water, and which therefore may be used in the arts in place of absolute alcohol.

My product may be diluted and in that condition may be used in the arts in place of wood-spirits, methyl alcohol, or other denaturized spirit.

Having thus described my invention, I claim—

1. The process of producing alcohol for use in the arts only, which consists of forming a mixture of hydrogen-ethyl sulfate, water, and a noxious body which has a boiling-point approximating that of alcohol, subjecting said mixture to heat, and finally condensing the resultant vapors.

2. A step in the process of producing alcohol for use in the arts only, which consists in introducing into hydrogen-ethyl sulfate a noxious body having a boiling-point approximating that of alcohol.

3. A step in the process of producing alcohol for use in the arts only, which consists in introducing into hydrogen-ethyl sulfate from one to three per cent. of bone-oil.

4. The process of producing a denaturized alcohol derived from calcium carbid during its process of manufacture, which consists in introducing into the hydrogen-ethyl sulfate formed in said process, a noxious body having a boiling-point approximating that of alcohol, subsequently introducing water, and finally subjecting the resultant mixture to distillation and condensation.

In testimony whereof I affix my signature in the presence of two witnesses.

GEORGE HILLARD BENJAMIN.

Witnesses:
W. H. PUMPHREY,
J. E. PEARSON.